J. W. PORTER AND R. L. ARNDT.
TRACTION BELT.
APPLICATION FILED MAY 6, 1918.
1,339,786.
Patented May 11, 1920.
3 SHEETS—SHEET 1.
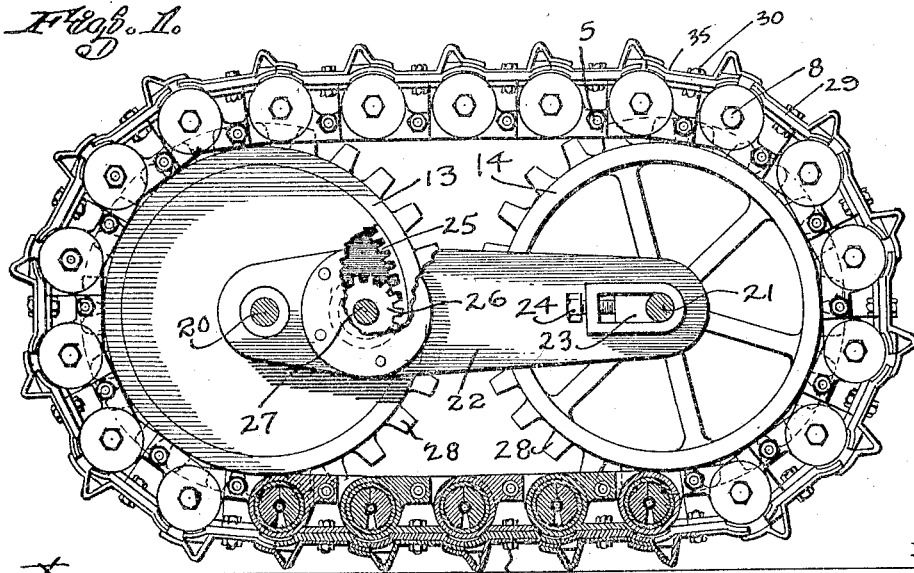
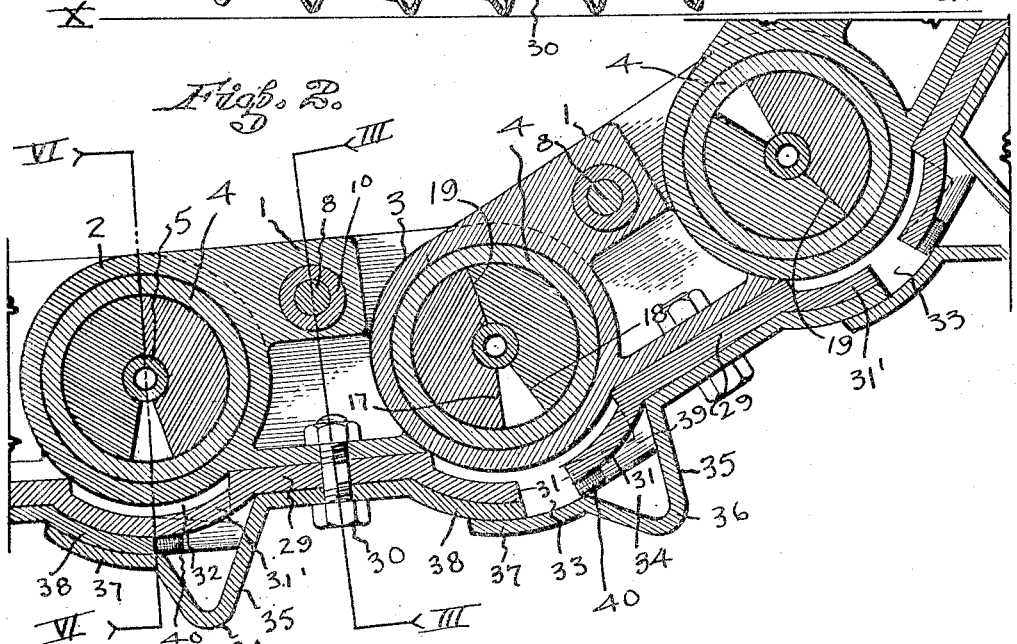
WITNESSES:
INVENTORS
Joseph W. Porter
Richard L. Arndt
BY
ATTORNEY.

J. W. PORTER AND R. L. ARNDT.
TRACTION BELT.
APPLICATION FILED MAY 6, 1918.
1,339,786.
Patented May 11, 1920.
3 SHEETS—SHEET 2.
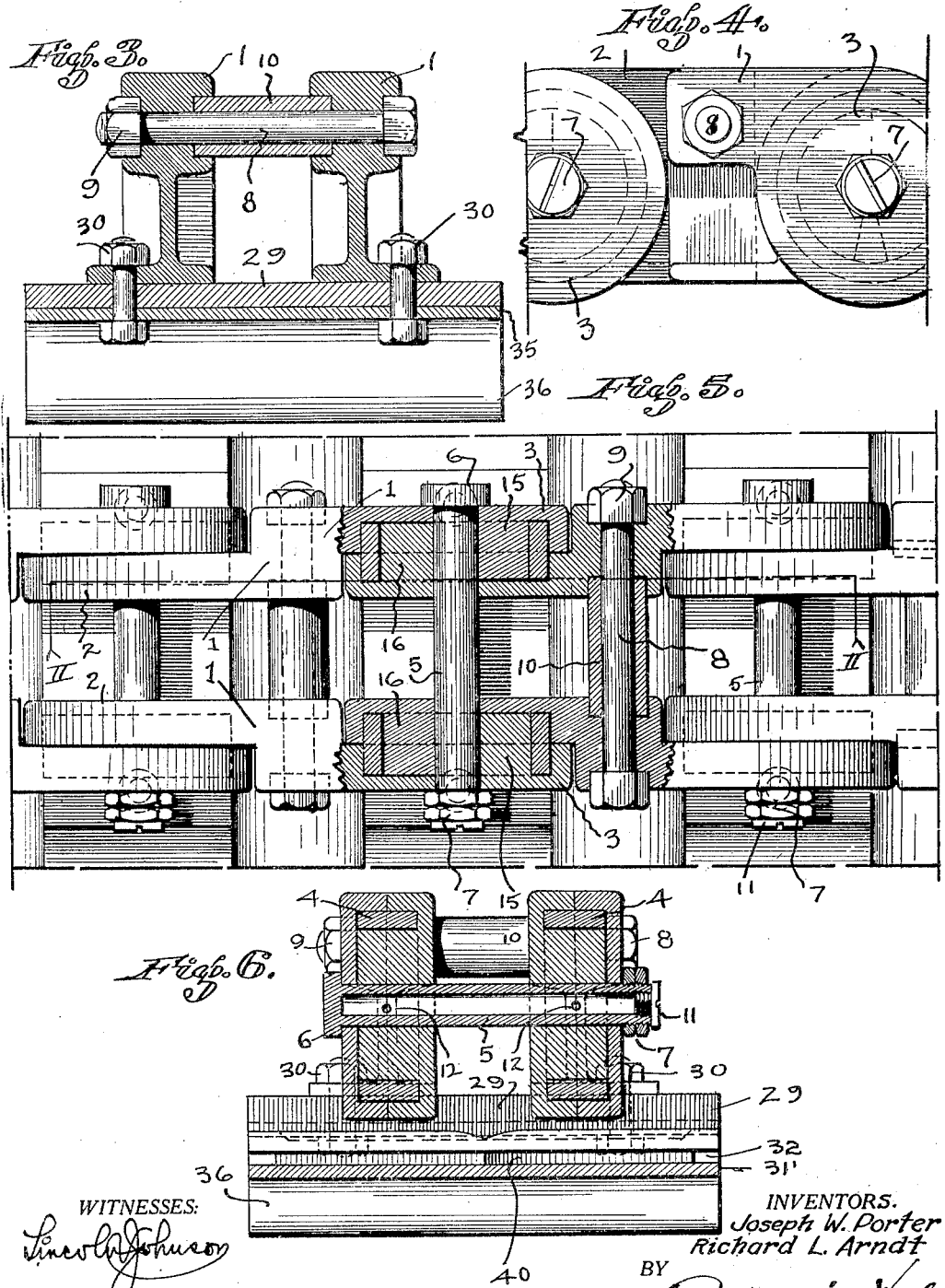
WITNESSES:
INVENTORS.
Joseph W. Porter
Richard L. Arndt
BY
ATTORNEY.

J. W. PORTER AND R. L. ARNDT.
TRACTION BELT.
APPLICATION FILED MAY 6, 1918.
1,339,786.
Patented May 11, 1920.
3 SHEETS—SHEET 3.
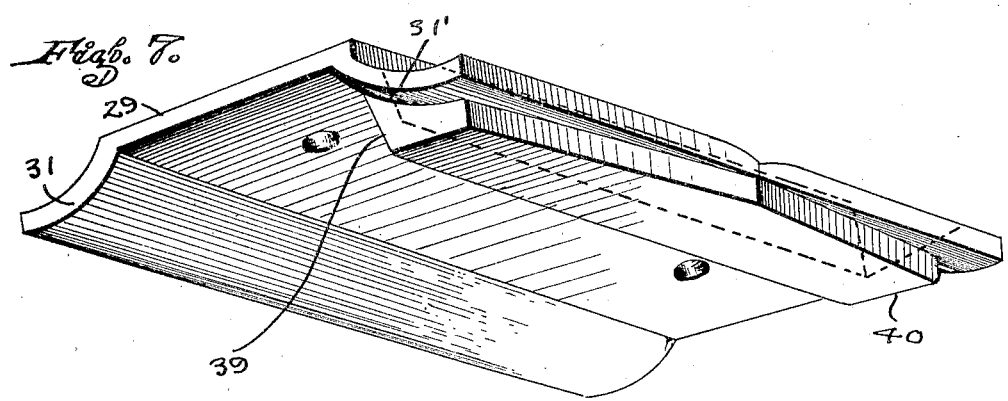
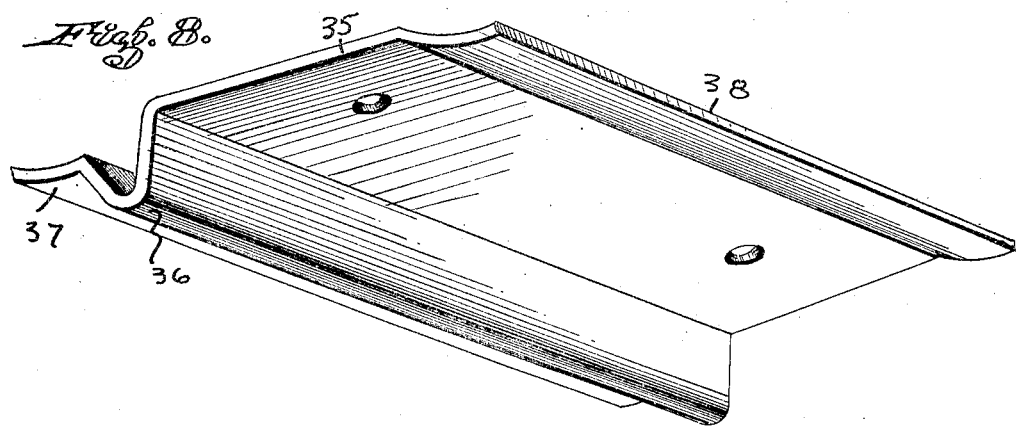
WITNESSES:
INVENTORS
Joseph W. Porter
Richard L. Arndt
BY
ATTORNEY.

UNITED STATES PATENT OFFICE.

JOSEPH W. PORTER, OF OAKLAND, AND RICHARD L. ARNDT, OF SAN FRANCISCO, CALIFORNIA, ASSIGNORS TO UNION TRACTOR COMPANY, OF SAN FRANCISCO, CALIFORNIA, A CORPORATION OF CALIFORNIA.

TRACTION-BELT.

1,339,786.     Specification of Letters Patent.     Patented May 11, 1920.

Application filed May 6, 1918. Serial No. 232,733.

*To all whom it may concern:*

Be it known that we, JOSEPH W. PORTER and RICHARD L. ARNDT, both citizens of the United States, and residing, respectively, in the city of Oakland, county of Alameda, and the city and county of San Francisco, State of California, have made a new and useful Invention—to wit, Improvements in Traction-Belts; and we do hereby declare the following to be a full, clear, concise, and exact description of the same.

The invention relates particularly to traction belts for tractors and has for its object the substitution of traction belts for the concentric wheels; to increase the tractive area at the ground tread to prevent slipping; to eliminate the necessity for supporting trucks or rollers to carry the weight of the tractor intermediate the sprockets around which the traction belt travels; and to maintain a camber or convexity on the ground portion of the belt. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatever form it may be embodied.

In the accompanying three sheets of drawings:

Figure 1 is a side elevation of a traction unit showing a traction belt constructed in accordance with this invention, and illustrated partially in cross section.

Fig. 2 is a greatly enlarged detail in longitudinal section on the line II—II, Fig. 5, illustrating the articulation between the links forming the traction chain or belt.

Fig. 3 is a cross section of the traction belt taken on the line III—III, Fig. 2.

Fig. 4 is a fragmentary side elevation in enlarged detail of the overlapping link ends.

Fig. 5 is a plan view from above of a section of belt as illustrated in Fig. 2, shown partially in cross section to illustrate the interrelation of parts.

Fig. 6 is a cross section of the same, taken on the line VI—VI Fig. 2.

Fig. 7 is a perspective view from below of the base plate.

Fig. 8 is a similar view of the tread plate.

The construction illustrated in the drawings includes, an endless chain composed of joined links having overlapping ends and articulated on pivotal bolts, and armed with tread plates overlapping to form a closed tread on the belt, which is adapted to be driven around the sprockets at the opposite ends of the traction truck. In detail the links comprise internal link sides offset at 1 and having the rounded ends 2 and 3. These ends 2 and 3 have annular grooves formed therein facing in opposite directions. The annular rings 4 are equal in width to the combined depth of the said annular grooves into which they snugly fit. The overlapping link ends 2 and 3 are preferably offset as shown, with the two ends 2—2 inside and the ends 3—3 outside. It is obvious, however, that the links may be formed without the offset, the complete links alternating outside and inside around the chain. These links are designed to be fabricated by drop forging in steel of suitable texture, having the annular grooves machined therein; or they may be cast in steel or other suitable material.

Concentric with the annular rings, the ends 2 and 3 are bored to receive the hollow bolts 5, having the head 6 on one side and the nut 7 on the opposite side of the chain, to act as pivot centers for the articulated joints. The actual strain of the joint is borne more particularly by the annular rings 4, snugly fitted in their respective sockets or grooves, within which they are free to rotate, thus distributing the wear and reducing the friction at these joints. These rings 3 may be made of hard steel, and polished on all surfaces.

The opposed links of the chain are joined intermediate their articulated joints by the bolts 8 extending across the width of the chain and having the nuts 9 threaded thereon. The link sides are separated by the spacer sleeves 10, the opposite ends of which fit snugly within the sockets formed in the opposed link sides the proper depth, whereby the tightening of the nuts 9 pulls the links together against the ends of the spacers 10, to separate the links laterally the exact distance required. Thus assembled, a very rigid link is formed comprising the two side plates having their respective ends 2—2 and 3—3 held in alinement by their respective pivotal bolts 5 and oscillatable upon the rings 4. The bolts 5 are provided with the plugs 11 threaded therein for the purpose of introducing lubricant into the hollow bolts, which working through the by-passes 12 circulates through and lubricates the articulated joints.

It is the object of this invention to form a chain that flexes freely in a direction away from the ground line $x$—$x$ and is absolutely rigid in the opposite direction, whereby the ground portion of the belt, between the vertical centers of the sprockets 13 and 14, forms a rigid bridge, so far as upward bending is concerned; thus eliminating the necessity of supporting rollers bearing upon the top of the links within this space. To give even greater strength it is given a slight convexity or camber downwardly, that is to say, the chain can not be straightened flat. When the ends of the belt are joined and it is mounted upon the sprockets 13 and 14, as shown in Fig. 1, it bends freely therearound, but does not sag between them. This has a double benefit, the camber of the chain at the bottom supporting the weight of the tractor and the camber at the top supporting the weight of the chain suspended between the sprockets, preventing it sagging downward. This camber is accomplished by the segmental lugs 15 and 16 integrally formed on their respective ends 2 and 3 of the links, with their perimeters fitting snugly within the rings 4, surrounding the bolts 5 and having the abutting faces 17—18 (see Fig. 2) set at more than ninety degrees to the longitudinal line of the links whereby the abutment of the faces limits the flexibility of the belt in a direction upward from the ground line $x$—$x$ preventing it from being longitudinally straightened while the gaps 19—19 between the opposite ends of the segments permit the desired flexibility in the opposite direction. These shoulders 17 and 18 are effectually sealed within the joints by the interposed rings 4 so that dust and other matter is excluded from between the faces 17 and 18; but should foreign matter accumulate between these faces it would merely add to the camber of the tread portion. Two fixed abutting faces such as 17 and 18, do not wear appreciably; compression of metal at this point is too slight to take into consideration; and the large bearing area of the rings 4 and their contacting parts reduce wear to the minimum between the links of the chain; hence the camber in the chain remains permanent throughout the period that such a construction can be expected to last.

The traction truck comprises the sprockets 13 and 14, mounted upon the shafts 20 and 21, journaled within the side frames 22. The shaft 21 is adjustable by the block 23 controlled by the screw 24, threaded in a lug on the frame 22. The sprocket 13 is driven through the internal gear 25 enmeshed with the driving pinion 26 mounted on a shaft 27, suitably geared to a prime mover, not shown. The sprocket teeth 28 engage the sleeves 10 between the articulations of the chain, which remains stationary on the ground while the sprockets roll forward, thus advancing the tractor, the weight of which is supported on the shafts 20 and 21. It is usual to mount the shaft 21 in such a manner that it has a limited resilient rise in passing over obstructions, the truck pivoting on the shaft 27, applying this power intermediate the articulations, as at 10 has the great advantage of pulling the abutments 17—18 together and of reducing the wear on the articulations. A further advantage is the fact that the gaps 33 are not opened so wide in passing around the sprockets when the points of contact 10 are intermediate and lateral to the articulation.

To take the wear and tear incidental to traction, we provide the base plates 29 secured by the bolts 30 at opposite ends to the opposed link sides. These plates have the lateral edges 31 and 31' curved outwardly on a radius from the center of the bolts 5 in the adjacent articulation, the lateral edges of the series of plates abutting. The spaces 32 accommodate any dirt that may have entered, until the edges 31 separate as shown at 33 in Fig. 2, at which time accumulations will drop down and be moved forward into the cavity of the grousers 34, from whence it will escape laterally through the open ends thereof. The abutting edges 31—31' also contribute to the maintenance of the camber of the ground portion of the chain, tending to relieve some of the pressure between the abutments 17 and 18.

To take the direct road wear, we provide the grouser plates 35, secured to the plates 29 across the breadth of the belt by the bolts 30. These plates have grousers 36 struck up therefrom by drop forging or otherwise, and have the extended lips 37 overlying the similarly curved lips 38 on the adjacent plates 35. The lips 37 extend across the gaps 33 to exclude dirt at this point. To support the crushing strain on the grousers 36, we provide each plate 29 with a shoulder 39 extending across the width of the curved lateral edge 31 and also across the cavity of the grouser and abutting the edge of the adjacent plate 38. The lateral edges 40 of this lug 39 are backed away (see Fig. 7) to clear accumulations of dirt in the gap 33

Having thus described this invention, what we claim and desire to secure by Letters Patent is:

1. A traction belt including a series of pairs of jointed links, abutments in the joints of said links set at more than 90° to the longitudinal line of said links; a bearing ring partially inclosing said abutments and holding the link joints together longitudinally; spacer pins intermediate the link joints for holding the series of pairs of links together; and base plates fixed on said links and having abutting edges, whereby said belt can not be longitudinally straightened.

2. A traction belt including a jointed link chain; abutments in the joints of said chain set at more than ninety degrees to the longitudinal line of said links, a bearing ring partially inclosing said abutments and holding the joints together longitudinally, whereby said belt cannot be longitudinally straightened.

3. A traction belt including a series of pairs of jointed links, abutments in the joints of said links set at more than 90° to the longitudinal line of said links; a bearing ring partially inclosing said abutments; bearing pins with lubricant containing means therein, located concentrically with the bearing ring, passing through said link joints and holding the same together; spacer pins intermediate the link joints for holding the series of pairs of links together; and base plates fixed on said links and having abutting edges, whereby said belt can not be longitudinally straightened.

4. A traction belt including a jointed link chain; abutments in the joints of said chain set at more than ninety degrees to the longitudinal line of said links, a bearing ring partially inclosing said abutments and holding the joints together longitudinally; and base plates fixed on said links and having abutting edges, whereby said belt cannot be longitudinally straightened.

5. A traction belt including a series of pairs of jointed links; abutments in the joints of said links set at more than 90° to the longitudinal line of said links; bearing pins passing through said link joints for holding the same together; spacer pins intermediate the link joints for holding the series of pairs of links together and base plates fixed on said links having abutting edges whereby the belt can not be longitudinally straightened.

6. A traction belt including a series of pairs of jointed links; abutments in the joints of said links set at more than 90° to the longitudinal line of said links; bearing pins with lubricant containing means therein passing through said link joints for holding the same together; spacer pins intermediate the link joints for holding the series of pairs of links together and base plates fixed on said links having abutting edges whereby the belt can not be longitudinally straightened.

7. A traction belt including a jointed link chain, abutments in the joints of said chain set at more than ninety degrees to the longitudinal line of said links, a bearing ring partially inclosing said abutments and holding the joints together longitudinally; base plates fixed on said links and having abutting edges, whereby said belt cannot be longitudinally straightened; tread plates fixed to said abutting plates and having overlapping curved lips; and grousers formed on said tread plates adjacent to said lips.

8. A traction belt comprising a jointed link chain; said link members having their ends overlapping and provided with annular grooves; abutments on the overlapping ends of each of said links set at more than 90° to the longitudinal line of said links, said abutments being arranged to produce a camber; and a bearing ring adapted to fit within the annular groove, partially inclosing said abutments and holding the same together longitudinally.

9. A traction belt comprising a pair of jointed link chains; said link members having their ends overlapping and provided with annular grooves; abutments on the overlapping ends of each of said links set at more than 90° to the longitudinal line of said links, said abutments being arranged to produce a camber; a bearing ring adapted to fit within the annular groove, partially inclosing said abutments and holding the same together longitudinally; bearing pins, with lubricant containing means therein, passing through said link joints and spacer pins intermediate the link joints for holding the series of links together.

10. A device of the character described comprising a frame, supporting wheels on the frame and a belt to travel over said wheels, said belt comprising a plurality of link members having their ends overlapping and provided with annular grooves, a ring member in the grooves of each overlapping end of the links, connecting means extending through the overlapping ends of the links and concentric with the ring therein whereby the links are pivotally connected, and lug members between the pivoted links and carried thereby for limiting the pivotal movement of the links relative to each other, said lugs being arranged to produce a camber in the belt.

11. A device of the character described, including a traction belt, said belt comprising a plurality of pivotally connected sections, each section consisting of a pair of substantially parallel links offset laterally in opposite directions at their ends, said ends being formed with annular grooves adapted to register with the grooves in the adjacent sections, a ring interposed between each overlapping end of adjacent links and received in the grooves of said overlapping ends, connecting rods extending through the overlapping ends of said links and concentric with said rings, spaced abutments on the ends of the links and within said rings, the abutments of adjacent links being arranged to limit the pivotal movement of the sections and to produce a camber in the belt, and tread plates secured to said links.

In testimony whereof we have hereunto set our hands at San Francisco, California, this 26th day of March, 1918.

JOSEPH W. PORTER.
RICHARD L. ARNDT.

In presence of—
BALDWIN VALE,
LINCOLN V. JOHNSON.